Feb. 13, 1923.

J. T. FERRES

SHOCK ABSORBER

Filed Nov. 24, 1920

1,445,615

INVENTOR.
Jeffrey T. Ferres
BY Frederick Whyon
ATTORNEY

Patented Feb. 13, 1923.

1,445,615

UNITED STATES PATENT OFFICE.

JEFFREY T. FERRES, OF LOS ANGELES, CALIFORNIA.

SHOCK ABSORBER.

Application filed November 24, 1920. Serial No. 426,274.

*To all whom it may concern:*

Be it known that I, JEFFREY T. FERRES, a citizen of the United States, and a resident of Los Angeles, in the county of Los Angeles, State of California, have invented certain new and useful Improvements in Shock Absorbers, of which the following is a specification.

This invention relates to shock absorbers of the character employed in connection with motor vehicles for minimizing the shocks transmitted through the wheels of the vehicle to the axles, and an object of the invention is to produce an effective shock absorber of comparatively simple construction.

Another object is to provide a shock absorber of which the parts will not be liable to become disarranged while in use.

Another object is to utilize air as the shock absorbing cushion.

Another object is to provide for thorough lubrication of the plunger and cylinder walls, so as to minimize wear of the plunger and cylinder.

A still further object is to make provision for yieldingly checking the downward motion of the plunger when the vehicle wheels are subjected to a shock sufficiently great to tend to drive the plunger against one end of the cylinder.

The accompanying drawings illustrate the invention:

Figure 1:
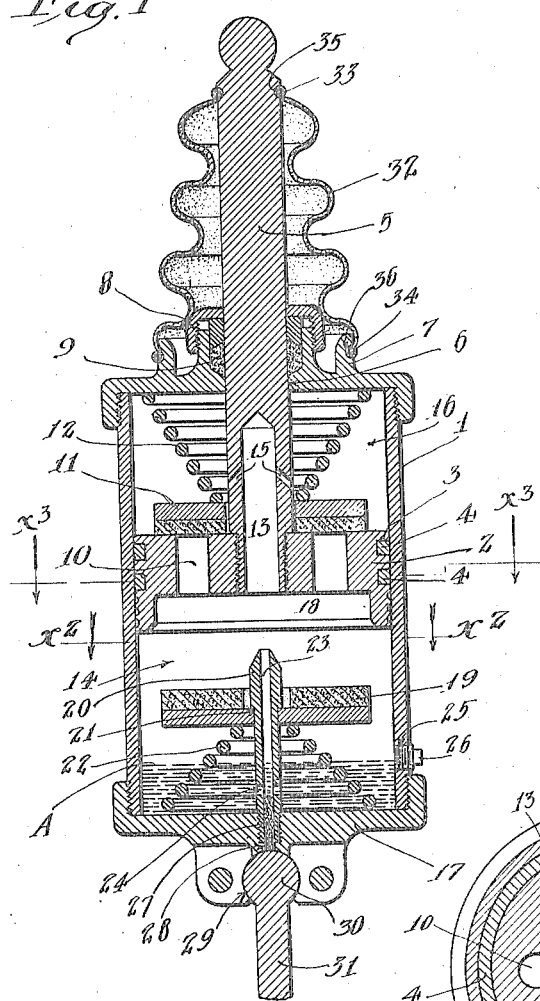
Figure 1 is a vertical mid-section of a shock absorber embodying the invention, one of the attaching members being partially broken away to contract the view.
Figure 3:
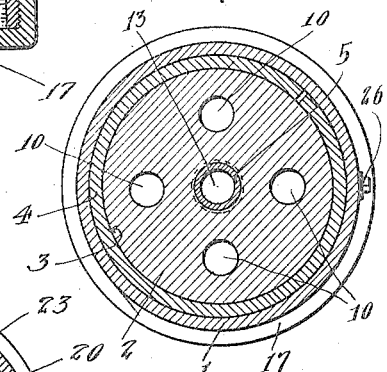
Figure 3 is a plan section on the line indicated by $x^3-x^3$, Figure 1.
Figure 2:
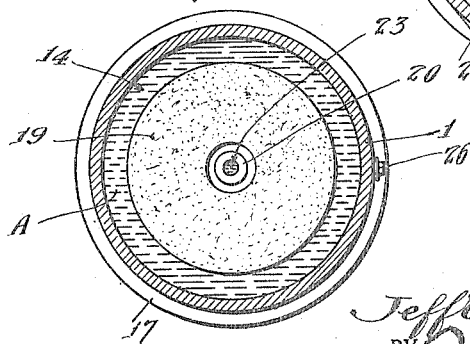
Figure 2 is a plan section on the line indicated by $x^2-x^2$, Figure 1.

There is provided a cylinder 1 and slidably fitting therein is a plunger 2 of any suitable construction. In the particular instance shown in the drawings, the plunger 2 is provided with annular grooves 3 in which are disposed piston rings 4 so as to make a comparatively close sliding fit between the plunger and the cylinder wall. The plunger 2 is provided with a stem 5, which passes through through an opening 6 in the head 7 of the cylinder. To minimize leakage of air from the cylinder, the head 7 is provided with a stuffing box 8 of any desired construction, the packing in said stuffing box being indicated at 9.

The plunger 2 is provided with a port or ports 10 extending from the front face to the rear face thereof. Positioned in the cylinder 1 between the plunger 2 and the head 7 is a valve 11 adapted to close the ports 10 when the plunger moves rearwardly toward the head 7. If the shock absorber be positioned with the head 7 uppermost as in the drawings, gravity and the air pressure upon the valve, upon upward movement of the plunger, may be relied upon to close the valve; but it is preferable to employ a spring to hasten the closing action of the valve and, therefore, such a spring is shown at 12. The spring 12 is preferably conical, so that it may be compressed into a minimum space, thus making it possible to employ a relatively short cylinder.

The stem 5 is provided with an axially extending duct 13 which opens through the inner end of the stem so as to communicate with the air chamber 14 formed by the space in the cylinder in front of the plunger. The duct 13 communicates through a port or ports 15 with the air chamber 16 formed by the space in the cylinder behind the plunger. The ports 15 are of small cross sectional area relative to the ports 10, so that when the valve 11 is closed during the movement of the plunger rearwardly toward the head 7 the air in the chamber 16 can escape but slowly therefrom through the ports 15 in order to retard the rearward movement of the plunger.

When the plunger 2 moves forwardly to a predetermined position, the front face of the plunger, which is recessed as indicated at 18, engages a second valve 19 adapted, when the plunger is in such predetermined position, to close the ports 10, thus preventing further escape of air from the chamber 14 excepting through the duct 13 and ports 15. When the ports 10 are thus closed by the valve 19, it is evident that the air in the chamber 14 forms a cushion to yieldingly check the movement of the plunger toward the head 17. The valve 19 is shiftably mounted on a post 20 and is yieldingly held against a shoulder 21 on the post by a spring 22 which is preferably conical for the same reason as that given in the above description of the spring 12.

The elements above described constitute by themselves an operative device and the operation thereof will now be described. The stem 5 and cylinder head 17 will be suitably connected to the axle and one of the vehicle springs or, vice versa, to one of the vehicle springs and the axle, so that when the chassis of the vehicle and the vehicle wheels relatively move from each other the plunger 2 will move rearwardly or toward the head 7, and so that when the chassis and wheels move relatively toward each other the plunger will move toward the valve 19. From this it is clear that when the vehicle wheels strike an obstruction or a rut the plunger 2 will move toward the valve 19, thus tending to compress air in the chamber 14, and this air pressure opens the valve 11 so as to permit air to escape from the chamber 14 into the chamber 16 by way of the ports 10.

Assuming, for example, that the shock is relatively slight, so that the plunger does not engage the valve 19 but starts to move away from said valve, as soon as retraction of the plunger begins the valve 11 closes, thus tending to compress air in the chamber 16, and such air forms a cushion tending to retard retraction of the plunger and hence tending to retard the separating movement of the chassis and wheels of the vehicle. However, the air in the chamber 16 is permitted to slowly escape so that the vehicle body and wheels can return to their normal positions relative to each other and such escape of the air takes place through the ports 15 and ducts 13, the air thus escaping being returned to the chamber 14. From this it is clear that under relatively slight shocks the vehicle axle and chassis will approach each other just the same as when the shock absorber is not used, and that an air cushion causes retardation in the subsequent separation of the axle and chassis.

Now assuming, for example, that the shock to which the vehicle is subjected is sufficiently strong to cause the plunger 2 and valve 19 to engage each other and thus close the ports 10, air will cease to escape from the chamber 16 excepting through the relatively small ports 15, so that the air cushion in the chamber 16 will check or retard the further forward movement of the plunger toward the head 17. The movement of the chassis and axle toward each other is thus stopped gradually, so that damage to the vehicle and the shock absorber is avoided.

Further features of the invention, not absolutely essential to its operation, will now be described. The post 20 is tubular, the axial duct being shown at 23, and the post thus constitutes a lubricant-discharge nozzle which is of less diameter than the duct 13, so that when the plunger moves forwardly sufficiently far the nozzle can enter the duct 13. To perform its function, it is not necessary that the nozzle enter the duct 13, but this makes it possible to have the cylinder 1 of minimum length. Near its lower end the duct 23 communicates by lateral ports 24 with the chamber 14, so that lubricant, indicated at A in Figure 1, can pass into the duct 23 from the chamber 14. When the plunger moves into engagement with the valve 19, the pressure of air upon the surface of lubricant outside of the nozzle 20 overbalances the air pressure in the duct 13, thus causing the lubricant to discharge from the nozzle into the duct 13. The lubricant thus discharged from the nozzle will gather upon and run down that portion of the wall of the duct 13 above the ports 15 and, consequently, will discharge through the ports 15 into the chamber 16 to lubricate the friction surfaces of the cylinder and plunger.

The lubricant A may be run into the cylinder through a filling opening 25 normally closed by a plug 26. Preferably extending into the lower end of the duct 23 is a wick 27, and said wick passes through a duct 28 in the head 17. The duct 28 opens into a ball socket 29 in which fits the ball 30 of a connecting member 31. The wick 27 thus lubricates the universal joint formed by the socket 29 and ball 30.

It is preferable to enclose the portion of the stem 5 which projects from the stuffing box 8 and for this purpose a tubular flexible cover 32 is provided, said cover being suitably fastened at one end to the stem 5 and at its opposite end to the head 7. In the instance shown in the drawings, the cover 32 is provided at its ends with rings 33, 34, respectively, the ring 33 engaging in an annular recess 35 in the stem 5, and the ring 34 engaging an annular recess 36 in the periphery of the cylinder head 7. The cover 32 is of sufficient length to permit of the full outward movement of the stem, and when the stem moves inwardly the cover arranges itself in folds, as clearly shown in Figure 1.

I claim:

1. In a shock absorber, the combination of a cylinder, a lubricant in the lower portion of the cylinder, there being an air space in the cylinder above said lubricant, a plunger in the cylinder having a port, a stem for the plunger extending through one of the cylinder heads and having a duct communicating with the space in the cylinder in front of the plunger and having a port opening from the duct to the space in the cylinder behind the plunger, the last port being of less cross sectional area than the first port, and a valve for the first port adapted to be closed by the air pressure behind the plunger and to be opened by the air pressure in front of the plunger.

2. In a shock absorber, the combination of a cylinder, a plunger in the cylinder having a port, a stem for the plunger extending through one of the cylinder heads and having a duct communicating with the space in the cylinder in front of the plunger and having a port opening from the duct to the space in the cylinder behind the plunger, the last port being of less cross sectional area than the first port, a valve for the first port adapted to be closed by the air pressure behind the plunger and to be opened by the air pressure in front of the plunger, and a second valve for closing the first port when the plunger moves forward to a predetermined position.

3. In a shock absorber, the combination of a cylinder, a plunger in the cylinder having a port, a stem for the plunger projecting through one of the cylinder heads, and a tubular flexible cover surrounding the stem and secured thereto at one end and secured at its opposite end to the adjacent head of the cylinder, means to permit a relatively small leakage of air from the space behind the plunger to the space in front thereof independently of the port, and a valve for the port adapted to be closed by the air pressure behind the plunger and to be opened by the air pressure in front of the plunger.

4. In a shock absorber, the combination of a cylinder, a plunger in the cylinder having a port, means to permit a relatively small leakage of air from the space behind the plunger to the space in front thereof independently of the port, a valve for the port adapted to be closed by the air pressure behind the plunger and to be opened by the air pressure in front of the plunger, a second valve for closing the first port when the plunger moves forward to a predetermined position, and a lubricant in the cylinder beneath the last valve, there being an air space in the cylinder above the lubricant.

5. In a shock absorber, the combination of a cylinder, a plunger in the cylinder having a port, means to permit a relatively small leakage of air from the space behind the plunger to the space in front thereof independently of the port, a valve for the port adapted to be closed by the air pressure behind the plunger and to be opened by the air pressure in front of the plunger, a second valve for closing the port when the plunger moves forward to a predetermined position, means yieldingly holding the second valve in said predetermined position, and a lubricant in the cylinder beneath the last valve, there being an air space in the cylinder above the lubricant.

6. In a shock absorber, the combination of a cylinder, a plunger in the cylinder having a port, a stem for the plunger extending through one of the cylinder heads and having a duct communicating with the space in the cylinder in front of the plunger and having a port opening from the duct to the space in the cylinder behind the plunger, the last port being of less cross sectional area than the first port, a valve for the first port adapted to be closed by the air pressure behind the plunger and to be opened by the air pressure in front of the plunger, a second valve for closing the first port when the plunger moves forward to a predetermined position, and a nozzle discharging toward the duct, the nozzle duct communicating by a port with the space in the cylinder in front of the plunger.

7. In a shock absorber, the combination of a cylinder, a plunger in the cylinder having a port and having a stem projecting through one end of the cylinder, a lubricant in the cylinder, a connecting member, means forming a socket on one end of the cylinder, there being a duct leading from the socket into the cylinder, a connecting member having a ball at one end fitting in the socket, and a valve operating to close the port when the plunger moves toward one end of the cylinder, said valve being opened by fluid pressure when the plunger moves toward the opposite end of the cylinder.

Signed at Los Angeles, California, this 17th day of November 1920.

JEFFREY T. FERRES.

Witnesses:
  GEORGE H. HILES.
  L. BELLE WEAVER.